US012598552B2

(12) United States Patent
Maleki et al.

(10) Patent No.: US 12,598,552 B2
(45) Date of Patent: Apr. 7, 2026

(54) EMPLOYING PAGING EARLY INDICATOR FOR IDLE MODE WIRELESS COMMUNICATION DEVICE POWER SAVINGS

(71) Applicant: Telefonaktiebolaget LM Ericsson (publ), Stockholm (SE)

(72) Inventors: Sina Maleki, Malmö (SE); Ali Nader, Malmö (SE); Andres Reial, Höllviken (SE); Ilmiawan Shubhi, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 18/032,858

(22) PCT Filed: Oct. 22, 2021

(86) PCT No.: PCT/EP2021/079370
§ 371 (c)(1),
(2) Date: Apr. 20, 2023

(87) PCT Pub. No.: WO2022/084517
PCT Pub. Date: Apr. 28, 2022

(65) Prior Publication Data
US 2023/0397115 A1     Dec. 7, 2023

Related U.S. Application Data

(60) Provisional application No. 63/104,870, filed on Oct. 23, 2020.

(51) Int. Cl.
*H04W 52/02*     (2009.01)
*H04W 68/02*     (2009.01)
*H04W 76/28*     (2018.01)

(52) U.S. Cl.
CPC ... *H04W 52/0235* (2013.01); *H04W 52/0245* (2013.01); *H04W 68/02* (2013.01); *H04W 76/28* (2018.02)

(58) Field of Classification Search
CPC ......... H04W 52/0235; H04W 52/0245; H04W 68/02; H04W 76/28; Y02D 30/70
See application file for complete search history.

(56) References Cited

U.S. PATENT DOCUMENTS

2021/0314866 A1* 10/2021 Lee ................... H04W 52/0229
2021/0360621 A1   11/2021 Jiang et al.
(Continued)

FOREIGN PATENT DOCUMENTS

| | | |
|---|---|---|
| CN | 111278027 A | 6/2020 |
| WO | 2021162623 A1 | 8/2021 |

(Continued)

OTHER PUBLICATIONS

CATT, "R1-1902025: UE Power saving schemes and power saving signal/channel," 3GPP TSG RAN WG1 Meeting #96, Feb. 25-Mar. 1, 2019, Athens, Greece, 25 pages.
(Continued)

*Primary Examiner* — Robert C Scheibel
(74) *Attorney, Agent, or Firm* — Withrow & Terranova, PLLC

(57) ABSTRACT

Systems and methods for employing a paging early indicator (PEI) for power savings in an idle mode wireless communication device. In one embodiment, a method performed by a wireless communication device comprises receiving, from a network node, information that configures one or more PEI occasions prior to a paging occasion (PO) of the wireless communication device and making a determination as to whether to monitor for a PEI in the one or more PEI occasions or to skip monitoring for a PEI in the one or more
(Continued)

RECEIVE A CONFIGURATION REGARDING ONE OR MORE PEI OCCASIONS BEFORE ITS PO
*700*

DETERMINE POWER CONSUMPTION FOR MONITORING FOR PEI
*710a*

DETERMINE POWER CONSUMPTION FOR MONITORING PO
*710b*

DETERMINE WHETHER TO MONITOR FOR PEI OR SKIP PEI MONITORING
*720*

MONITOR PEI OR SKIP PEI MONITORING IN ACCORDANCE WITH DETERMINATION OF STEP 720
*730*

PEI occasions. The method further comprises either monitoring for a PEI in the one or more PEI occasions or skipping monitoring for a PEI in the one or more PEI occasions, in accordance with the determination. In this manner, utilization of PEI monitoring at the wireless communication device is optimized to achieve UE power savings.

23 Claims, 11 Drawing Sheets

(56) References Cited

U.S. PATENT DOCUMENTS

| | | | |
|---|---|---|---|
| 2022/0116876 A1* | 4/2022 | Sun | H04L 1/203 |
| 2022/0303795 A1* | 9/2022 | Bala | H04W 24/08 |
| 2023/0108646 A1* | 4/2023 | Tseng | H04W 68/025 |
| | | | 455/458 |

FOREIGN PATENT DOCUMENTS

| | | |
|---|---|---|
| WO | 2022029039 A1 | 2/2022 |
| WO | 2022043267 A1 | 3/2022 |

OTHER PUBLICATIONS

CATT, "R1-1911415: Offline Discussion Summary of PDCCH-based Power Saving Signal/Channel," 3GPP TSG RAN WG1 Meeting #98bis, Oct. 14-20, 2019, Chongqing, China, 34 pages.

Interdigital, Inc., et al., "R1-1813244: Discussion on Triggering of Power Mode Adaptation," 3GPP TSG RAN WG1 Meeting #95, Nov. 12-16, 2018, Spokane, Washington, 5 pages.

International Search Report and Written Opinion for International Patent Application No. PCT/EP2021/079370, mailed Mar. 24, 2022, 16 pages.

Extended European Search Report for European Patent Application No. 25218061.7, mailed Feb. 18, 2026, 9 pages.

* cited by examiner 15 kHz
(L=4)

15 kHz
(L=8)

30 kHz
(L=4)

30 kHz
(L=8)

120 kHz
(L=64)

240 kHz
(L=64)

900

CONTROL SYSTEM
902

NETWORK
INTERFACE
908

PROCESSOR(S)
904

MEMORY
906

RADIO UNIT(S)
910

TX(S) 912

RX(S) 914

916

916

NETWORK NODE
900

MODULE(S)
1100

EMPLOYING PAGING EARLY INDICATOR FOR IDLE MODE WIRELESS COMMUNICATION DEVICE POWER SAVINGS

RELATED APPLICATIONS

This application is a 35 U.S.C. § 371 national phase filing of International Application No. PCT/EP2021/079370, filed Oct. 22, 2021, which claims the benefit of provisional patent application Ser. No. 63/104,870, filed Oct. 23, 2020, the disclosures of which are hereby incorporated herein by reference in their entireties.

TECHNICAL FIELD

The present disclosure relates to use of a paging early indicator for idle mode wireless communication devices.

BACKGROUND

In Third Generation Partnership Project (3GPP) Long Term Evolution (LTE) and New Radio (NR), idle/inactive Discontinuous Reception (DRX) is a key energy saving mechanism allowing a User Equipment (UE) to remain in deep sleep a dominant fraction of the time when no data transmission is ongoing. DRX operation by a UE entails paging monitoring and Radio Resource Management (RRM) measurements to determine the appropriate camping cell. The network (NW) (e.g., a network node such as, e.g., a NR base station (gNB)) configures the UE with a DRX period that determines the paging monitoring rate. Typically, RRM measurements are performed at same rate.

For LTE for Machine Type Communication (LTE-M) (or massive Machine Type Communication (mMTC)) and Narrowband Internet of Things (NB-IoT) devices for which DRX activities are a dominant source of energy consumption, a Wake-Up Signal (WUS) solution for idle mode was specified in Release 15. The approach defined a sequence-based signal design and addressed primarily the use case associated with Physical Downlink Control Channel (PDCCH) coverage extension, i.e., paging PDCCH repetition in a Paging Occasion (PO). The approach may be referred to as mMTC-WUS.

In connected mode, the connected mode DRX (cDRX) framework can be used for reducing unnecessary monitoring of scheduling PDCCH, when no new data is available for transmission in Layer 1 (L1). WUS for cDRX has been specified in Release 16, using a PDCCH-based WUS design. It may be referred to as connected mode-WUS.

In NR deployments, a cell is identified using one or more (up to 64 in Frequency Range 2 (FR2)) Synchronization Signal Block (SSB) beams. As illustrated in FIG. 1, an SSB occupies twenty Resource Blocks (RBs) and contains three components: a Primary Synchronization Signal (PSS) for coarse synchronization and cell group identification, a Secondary Synchronization Signal (SSS) for cell identification, and a Physical Broadcast Channel (PBCH) for primary System Information (SI) delivery (e.g., Master Information Block (MIB)). PSS and SSS are sequence-based while PBCH is encoded and includes Demodulation Reference Signal (DMRS) for channel estimation to enable decoding.

FIG. 2 illustrates candidate SSB positions for various cases. The multiple SSB beams are distributed in time as illustrated in FIG. 3.

SSB time locations are indexed from 0 to L-1 in increasing order within a half radio frame. Notably:

for L=4:
SSB time indices are indicated by the two Least Significant Bits (LSBs) of the three bits indicating eight different PBCH-DMRS sequences (the Most Significant Bit (MSB) is used for half-frame index), for L=8:
SS time indices are indicated by eight different PBCH-DMRS sequences, for L=64:
LSBs of SSB time index are indicated by eight different PBCH-DMRS sequences,
MSBs of SSB time index are indicated in NR-PBCH payload, and
three bits in NR-PBCH payload in below 6 Gigahertz (GHz) case may be used for other purpose(s)

Joint usage of NR-PBCH DMRS sequences and explicit bits (L=64 case) in NR-PBCH payload to indicate SSB time index follows the following principles:

MSB bits (b5, . . . , b3) for SSB time index in NR-PBCH payload only in case of above 6 GHz, These three bits in below 6 GHz case are used for other purpose (two reserved bits and one MSB bit for SSB-subcarrier-offset), two or three LSBs of SSB index are indicated by four or eight DMRS sequences, E.g., for 120 kilohertz (kHz) subcarrier spacing (SCS), FIG. 4 shows the indication of SSB time index from 0 to 63. Note that each of the smallest boxes means a slot, each of which includes two SSBs, and eight DMRS sequences map to four boxes.

There currently exist certain challenge(s). In the 3GPP Release 17 Work Item (WI) on UE power savings, there is a growing desire to develop a paging early indicator (PEI) similar to a WUS for paging. The idea is to send an indication to the UE before a paging message such that the UE is aware of whether it has to monitor its paging occasion (PO). In case the UE does not have to monitor its PO (i.e., the UE is not expected to be paged), then the UE can go back to sleep and skip monitoring its PO as well as early wake-up for synchronization purposes, and thus potentially achieve power saving.

The PEI can be either a Downlink Control Information (DCI) based signaling or sequence-based, e.g., as in a Reference Signal (RS). Irrespective of the type of PEI, as mentioned above, the thinking is that, if the UE is aware of an incoming paging in advance, it can achieve power savings.

SUMMARY

Systems and methods for employing a paging early indicator (PEI) for power savings in an idle mode wireless communication device. In one embodiment, a method performed by a wireless communication device comprises receiving, from a network node, information that configures one or more PEI occasions prior to a paging occasion (PO) of the wireless communication device and making a determination as to whether to monitor for a PEI in the one or more PEI occasions or to skip monitoring for a PEI in the one or more PEI occasions. The method further comprises either monitoring for a PEI in the one or more PEI occasions or skipping monitoring for a PEI in the one or more PEI occasions, in accordance with the determination. In this manner, utilization of PEI monitoring at the wireless communication device is optimized to achieve UE power savings.

In one embodiment, the method further comprises determining a first amount of power that would be needed to monitor for a PEI in the one or more PEI occasions and determining a second amount of power that would be needed to monitor the PO, wherein making the determination as to whether to monitor for a PEI in the one or more PEI occasions or to skip monitoring for a PEI in the one or more PEI occasions comprises making the determination as to whether to monitor for a PEI in the one or more PEI occasions or to skip monitoring for a PEI in the one or more PEI occasions based on the first and second amounts of power. In one embodiment, making the determination as to whether to monitor for a PEI in the one or more PEI occasions or to skip monitoring for a PEI in the one or more PEI occasions is further based on an expected or maximum paging rate. In one embodiment, the determination is to monitor for a PEI in the one or more PEI occasions if $P_{PEI,t} < P_{PO}$, where $P_{PO}$ is the second amount of power that would be needed to monitor the PO and $P_{PEI,t}$ is a total power defined as:

$$P_{PEI,t} = PR*P_{PO,PEI} + (1-PR)P_{PEI}$$

where PR is the expected or maximum paging rate, $P_{PEI}$ is the first amount of power that would be needed to monitor for a PEI in the one or more PEI occasions, and $P_{PO,PEI}$ is equal to $P_{PO} + P_{PEI}$.

In one embodiment, the determination is to skip monitoring for a PEI in the one or more PEI occasions if $P_{PEI,t}$ is greater than $P_{PO}$, where $P_{PO}$ is the second amount of power that would be needed to monitor the PO and $P_{PEI,t}$ is a total power defined as:

$$P_{PEI,t} = PR*P_{PO,PEI} + (1-PR)P_{PEI}$$

where PR is the expected or maximum paging rate, $P_{PEI}$ is the first amount of power that would be needed to monitor for a PEI in the one or more PEI occasions, and $P_{PO,PEI}$ is equal to $P_{PO} + P_{PEI}$.

In one embodiment, the determination is to skip monitoring for a PEI in the one or more PEI occasions if the first amount of power is equal to or within a specified range of the second amount of power.

In one embodiment, the method further comprises determining a first amount of power that would be needed to monitor for a PEI in the one or more PEI occasions, wherein the determination is to skip monitoring for a PEI in the one or more PEI occasions if the first amount of power is greater than a predefined, configured, or determined threshold.

In one embodiment, making the determination as to whether to monitor for a PEI in the one or more PEI occasions or to skip monitoring for a PEI in the one or more PEI occasions comprises making the determination as to whether to monitor for a PEI in the one or more PEI occasions or to skip monitoring for a PEI in the one or more PEI occasions based on one or more parameters. In one embodiment, the one or more parameters comprise:

(a) channel quality,
(b) Signal-to-Interference-plus-Noise Ratio (SINR),
(c) Synchronization Signal Reference Signal Received Power (SS-RSRP),
(d) Synchronization Signal Reference Signal Received Quality (SS-RSRQ), or
(e) any two or more of (a)-(d).

In one embodiment, making the determination is further based on a Discontinuous Reception (DRX) cycle length of a DRX configuration of the wireless communication device.

In one embodiment, making the determination is further based on a required paging detection reliability.

In one embodiment, making the determination is further based on a set of rules that depend on one or more parameters. In one embodiment, the one or more parameters comprise a combined state of channel quality, estimated paging rate, PEI monitoring window length, and/or traffic type.

In one embodiment, the method further comprises providing, to the network node, assistance information related to PEI monitoring at the wireless communication device.

In another embodiment, a method performed by a wireless communication device comprises providing, to a network node, assistance information related to PEI monitoring at the wireless communication device. In one embodiment, the method further comprises receiving a request for the assistance information from the network node. In one embodiment, the assistance information comprises information that informs the network node about whether the wireless communication device has skipped PEI monitoring and/or statistics about PEI monitoring at the wireless communication device. In one embodiment, the assistance information further comprises perceived Signal to Noise Ratio (SNR) at the wireless communication device, perceived SINR at the wireless communication device, perceived Reference Signal Received Power (RSRP) at the wireless communication device, and/or perceived Reference Signal Received Quality (RSRQ) at the wireless communication device. In one embodiment, providing the assistance information comprises providing the assistance information during connection setup or a paging response message.

Embodiments of a wireless communication device are also disclosed. In one embodiment, a wireless communication device is adapted to receive, from a network node, information that configures one or more PEI occasions prior to a PO of the wireless communication device and make a determination as to whether to monitor for a PEI in the one or more PEI occasions or to skip monitoring for a PEI in the one or more PEI occasions. The wireless communication device is further adapted to either monitor for a PEI in the one or more PEI occasions or skip monitoring for a PEI in the one or more PEI occasions, in accordance with the determination.

In one embodiment, a wireless communication device comprises one or more transmitters, one or more receivers, and processing circuitry associated with the one or more transmitters and the one or more receivers. The processing circuitry is configured to cause the wireless communication device to receive, from a network node, information that configures one or more PEI occasions prior to a PO of the wireless communication device and make a determination as to whether to monitor for a PEI in the one or more PEI occasions or to skip monitoring for a PEI in the one or more PEI occasions. The processing circuitry is further configured to cause the wireless communication device to either monitor for a PEI in the one or more PEI occasions or skip monitoring for a PEI in the one or more PEI occasions, in accordance with the determination.

Embodiments of a method performed by a base station are also disclosed. In one embodiment, a method performed by a base station comprises receiving, from a wireless communication device, assistance information related to PEI monitoring at the wireless communication device and adapting a PEI scheme used by the base station based on the assistance information.

In one embodiment, the method further comprises sending a request for the assistance information to the wireless communication device.

5

In one embodiment, the assistance information comprises perceived SNR, SINR, RSRP, and/or RSRQ at the wireless communication device, information that informs the network node about whether the wireless communication device has skipped PEI monitoring, and/or statistics about PEI monitoring at the wireless communication device.

Corresponding embodiments of a base station are also disclosed. In one embodiment, a base station is adapted to receive, from a wireless communication device, assistance information related to PEI monitoring at the wireless communication device and adapt a PEI scheme used by the base station based on the assistance information.

In one embodiment, a base station comprises processing circuitry configured to cause the base station to receive, from a wireless communication device, assistance information related to PEI monitoring at the wireless communication device and adapt a PEI scheme used by the base station based on the assistance information.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
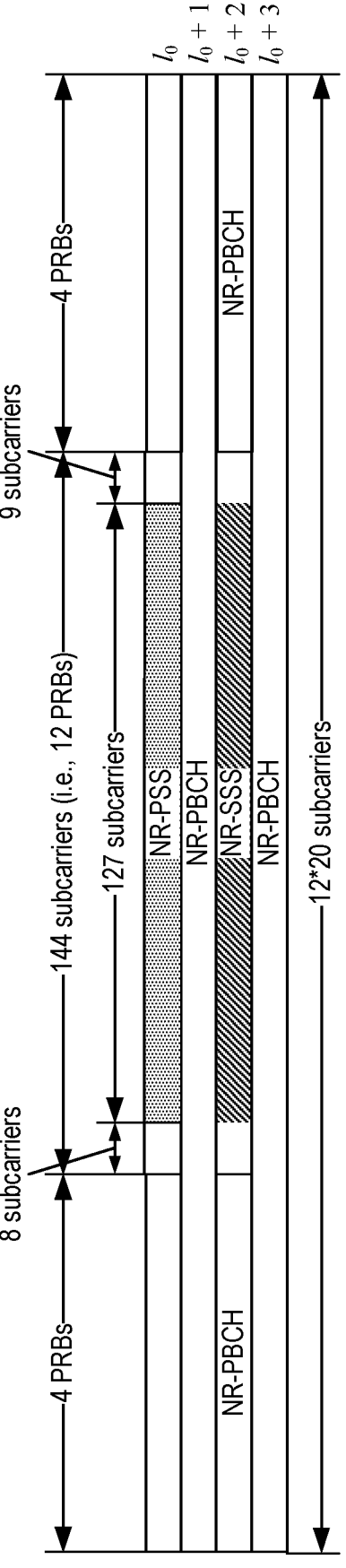
FIG. 1 illustrates a Synchronization Signal Block (SSB) in accordance with current Third Generation Partnership Project (3GPP) New Radio (NR) specifications.
Figure 2:
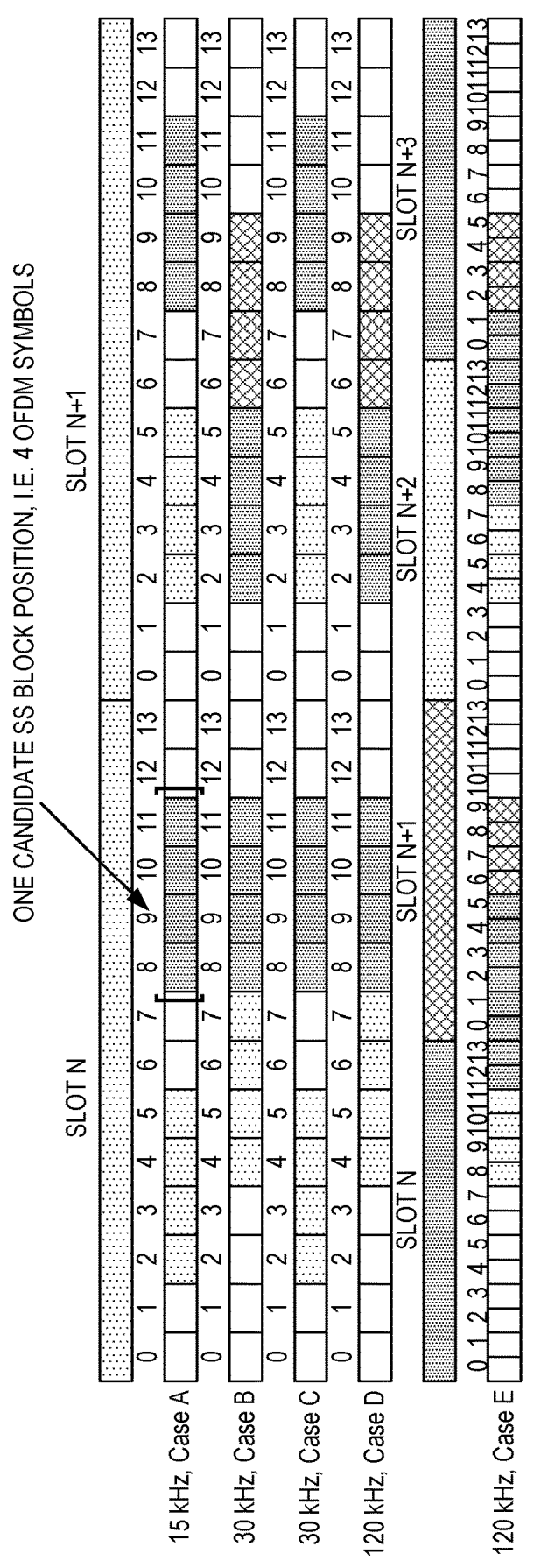
FIG. 2 illustrates candidate SSB positions for various cases.
Figure 3:
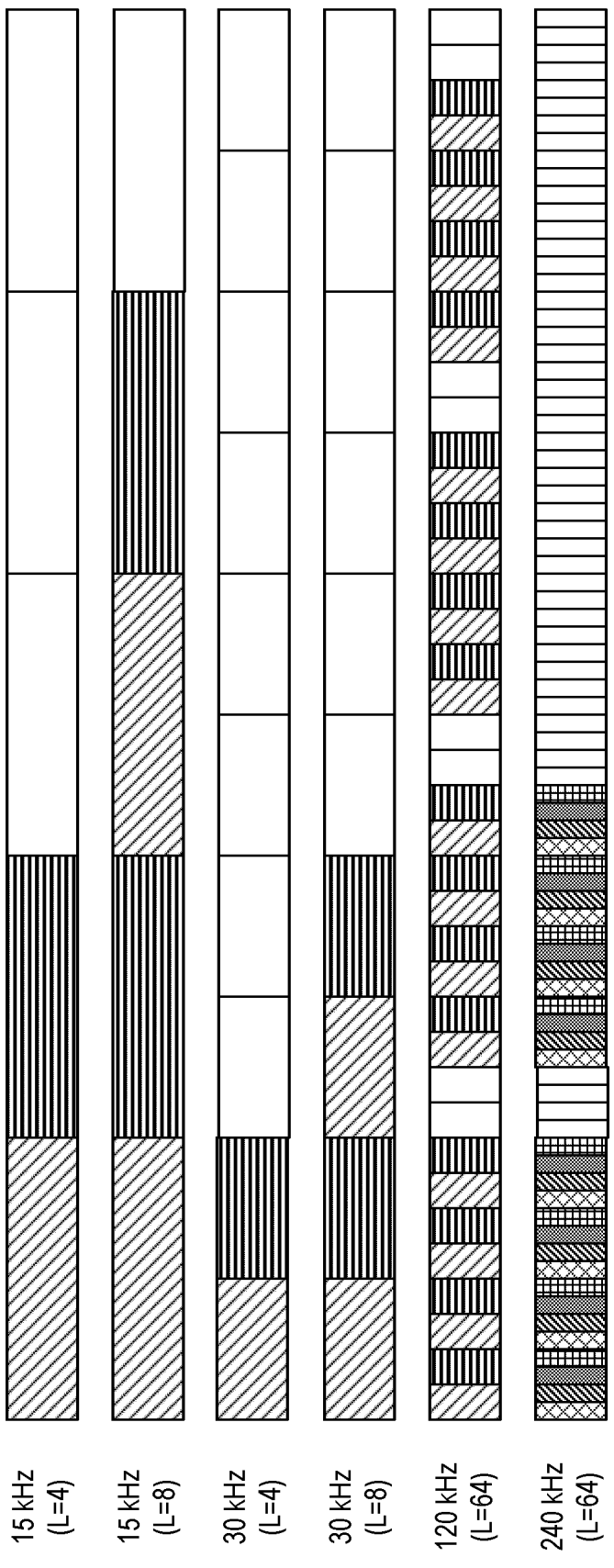
FIG. 3 illustrates how multiple SSB beams are distributed in time.
Figure 4:
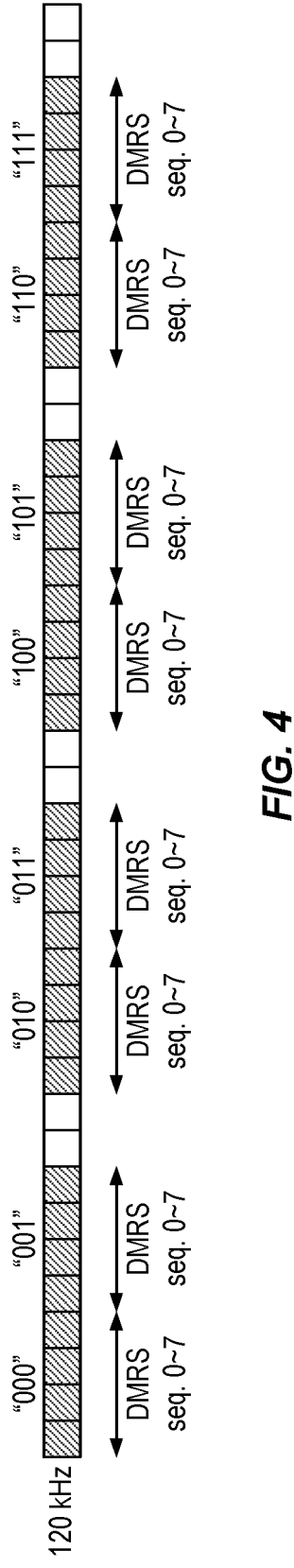
FIG. 4 shows the indication of SSB time index from 0 to 63 for an example of 120 kilohertz (kHz) subcarrier spacing (SCS)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Idle: As used herein, "idle" refers to both RRC_IDLE and RRC_INACTIVE modes.

Paging Early Indication (PEI): The term "PEI" should be understood as interchangeable with other possible terminology for signaling aimed at informing UEs about an upcoming paging transmission in an upcoming paging occasion (PO), e.g. advance paging indication, wake-up signal for paging, etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, there currently exist certain challenge(s). In the 3GPP Release 17 Work Item (WI) on UE power savings, there is a growing desire to develop a paging early indicator (PEI) similar to a wake-up signal (WUS) for paging. The idea is to send an indication to the UE before a paging message, such that the UE is aware if it has to monitor its paging occasion (PO). In case the UE does not have to monitor its PO (i.e., the UE is not expected to be paged), then the UE can go back to sleep and skip monitoring its PO as well as early wake-up for synchronization purposes, and thus potentially achieve power saving.

The PEI can be either a Downlink Control Information (DCI) based signaling or sequence-based, e.g., as in a Reference Signal (RS). Irrespective of the type of PEI, as mentioned above, the thinking is that, if the UE is aware of an incoming paging in advance, it can achieve power savings. However, this might not always be the case, particularly if the UE is in good coverage. Thus, there is a need for systems and methods with which the UE can decide to monitor a configured PEI or not, in order to achieve power savings in idle mode.

Certain aspects of the present disclosure and their embodiments may provide solutions to the aforementioned or other challenges. It is assumed that the network (NW) provides an idle mode configuration of a PEI to one or more UEs within a cell, e.g., through system information (SI). Systems and methods are disclosed herein in which the UE decides to monitor or skip a PEI before its PO in order to achieve power savings in idle mode. In one embodiment, given the PEI configuration (e.g., offset(s), window length, etc.) and estimated channel conditions and paging rate, the UE compares expected energy consumption with and without PEI monitoring and selects the mode (i.e., a first mode in which it monitors PEI and a second mode in which it skips PEI monitoring) that provides better energy efficiency.

In some embodiments, the UE may monitor for PEI if the Signal to Interference plus Noise Ratio (SINR) is low and the lack of PEI allows the UE to skip performing extensive synchronization to prepare for potential paging Physical Downlink Shared Channel (PDSCH) detection. In one embodiment, the UE skips monitoring for PEI and always monitors the PO if the SINR is high (e.g., above a predefined, configured, or determined threshold SINR level) and/or the paging rate is high (e.g., above a predefined, configured, or determined paging rate threshold) so that most PEI occasions indicate the presence of paging, or PEI reception failure may degrade overall paging reception performance. In one embodiment, the level of SINR (high/low) is related to the spectral efficiency used for the NW transmitted paging related message. In one embodiment, the UE may have prior knowledge of what level of coding (e.g., Modulation, Coding, Transport Block (TB)-Scaling) is used for the paging message and, based on that, decide its SINR high/low thresholds.

In one aspect, the UE provides information to the NW about usage of PEI (e.g., PEI used/notUsed), e.g., in a paging response, based upon which the NW can decide whether to maintain PEI provision or not.

Certain embodiments may provide one or more of the following technical advantage(s). Embodiments disclosed herein may help the UE to optimize the utilization of PEI monitoring and thereby achieve UE power savings.

Figure 5:
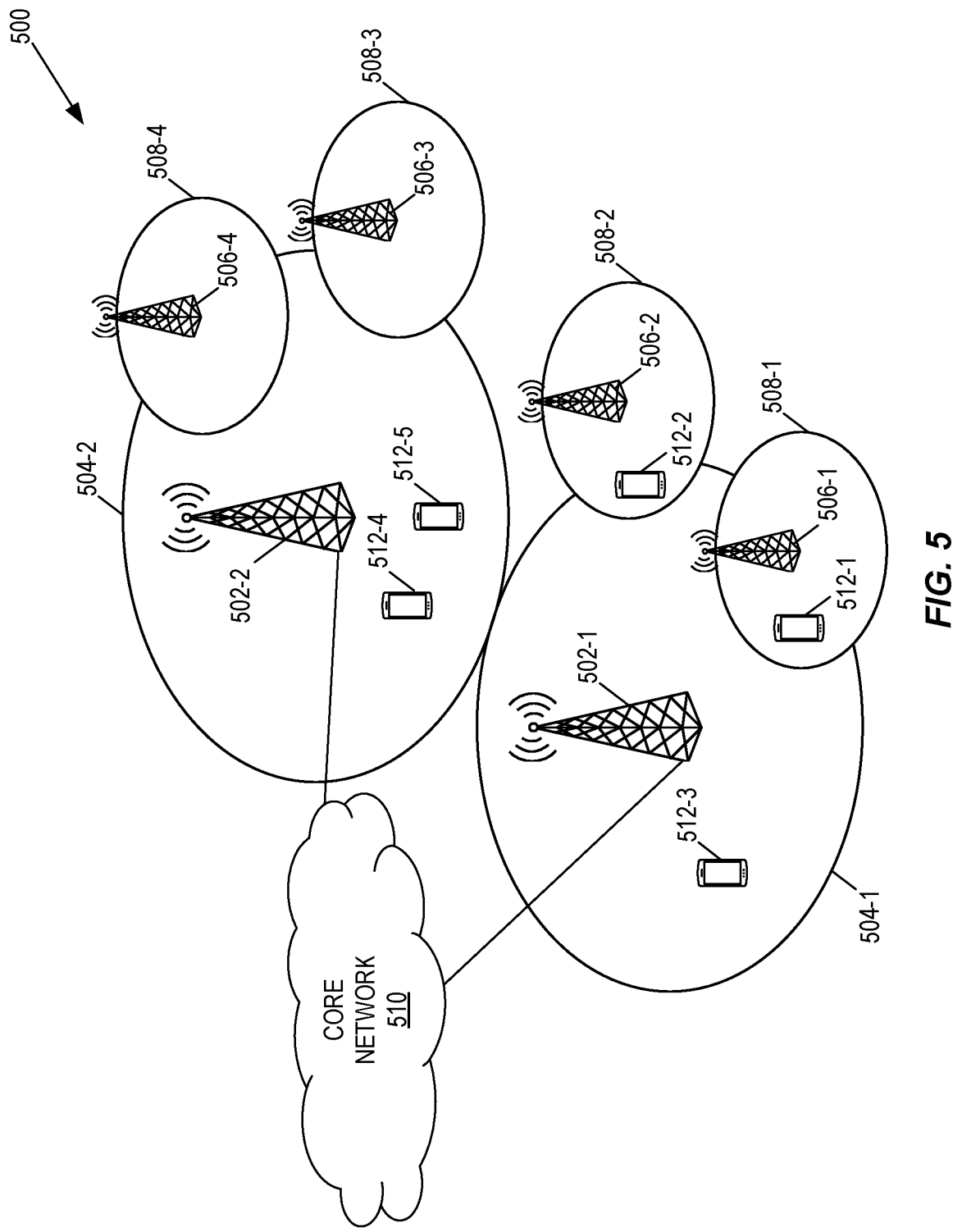
FIG. 5 illustrates one example of a cellular communications system in which embodiments of the present disclosure may be implemented.

FIG. 5 illustrates one example of a cellular communications system 500 in which embodiments of the present disclosure may be implemented. In the embodiments described herein, the cellular communications system 500 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 502-1 and 502-2, [which in the 5GS include NR base stations (gNBs) and optionally next generation eNBs (ng-eNBs) (e.g., LTE RAN nodes connected to the 5GC) and in the EPS include eNBs-, controlling corresponding (macro) cells 504-1 and 504-2. The base stations 502-1 and 502-2 are generally referred to herein collectively as base stations 502 and individually as base station 502. Likewise, the (macro) cells 504-1 and 504-2 are generally referred to herein collectively as (macro) cells 504 and individually as (macro) cell 504. The RAN may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like.

Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The cellular communications system 500 also includes a core network 510, which in the 5G System (5GS) is the 5GC and in the EPS is the EPC. The base stations 502 (and optionally the low power nodes 506) are connected to the core network 510.

The base stations 502 and the low power nodes 506 provide service to wireless communication devices 512-1 through 512-5 in the corresponding cells 504 and 508. The wireless communication devices 512-1 through 512-5 are generally referred to herein collectively as wireless communication devices 512 and individually as wireless communication device 512. In the following description, the wireless communication devices 512 are oftentimes UEs and as such sometimes referred to herein as UEs 512, but the present disclosure is not limited thereto.

Figure 6:
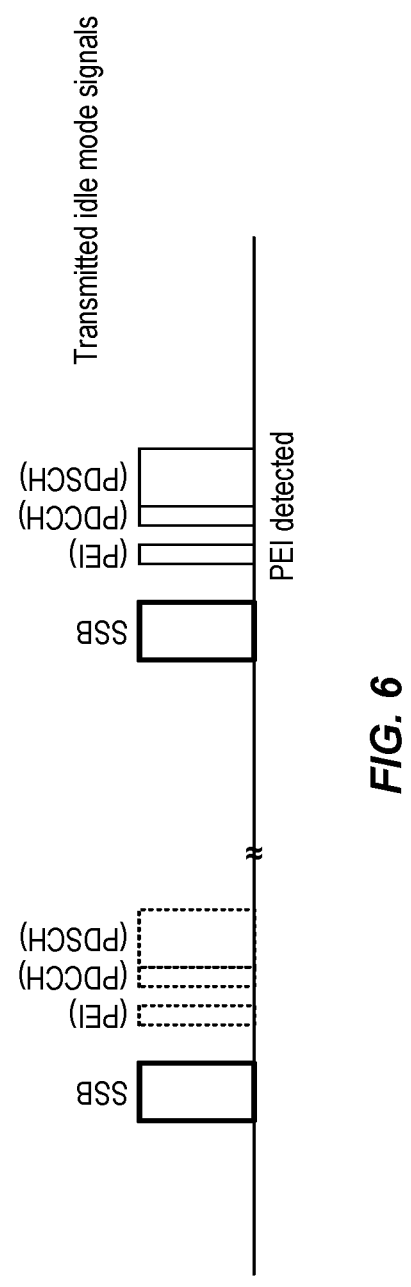
FIG. 6 provides an example paging early indicator (PEI) illustration.

Now, a description of some particular embodiments of the present disclosure will be provided. A scenario is considered where a network node (e.g., a base station 502) provides configuration of a PEI to one or more wireless communication devices 512 within a cell. The PEI is intended to inform a wireless communication device 512 or a group of wireless communication devices 512 that there is or not a paging message in one or more of the associated upcoming POs. The configuration can be provided through higher layer signaling, e.g., system information (SI), Radio Resource Control (RRC) release or dedicated signaling. The configuration can be further UE-specific or cell-specific. Furthermore, the configuration detail can entail, for example, the PEI occasion, PEI signal design, PEI interpretation and content, etc. FIG. 6 provides an example PEI illustration.

The PEI can be designed in different ways, e.g., a PDCCH or DCI based WUS, or a sequence based WUS, e.g., based on a reference signal such as Synchronization Signal Block (SSB), Tracking Reference Signal (TRS), Channel State Information Reference Signal (CSI-RS), etc. In one example, PEI can be a signal multiplexed in an existing paging DCI, e.g., a DCI format 1-0 associated with Paging Radio Network Temporary Identifier (P-RNTI) transmitted in a preceding PO. Alternatively, a new DCI format may be used, e.g., a DCI format similar to DCI format 2-6. In another example, PEI can be multiplexed with a RS, e.g., an SSB, or TRS. The systems, methods, and mechanisms described herein are applicable to all the underlying designs of a PEI. Furthermore, without the loss of generality, it is assumed that if the network node transmits a PEI, it intends to inform the wireless communication device 512 or a group of wireless communication devices 512 about an upcoming paging transmission in an associated upcoming PO.

As such, the wireless communication device 512 receives the PEI configuration from the higher layers, determines its associated PEI occasion(s), and then, in a default operation, the wireless communication device 512 monitors PEI in the corresponding occasion(s). If a PEI is received which indicates an expected paging transmission in the associated PO of the wireless communication device 512, then the wireless communication device 512 monitors its PO and decodes its paging PDxCH, where "PDxCH" means either PDCCH or PDSCH. Furthermore, the wireless communication device 512 decides on how many RSs, e.g., how many SSBs or TRSs, to employ for preparation operations, e.g., Amplitude Gain Control (AGC) and time/frequency synchronization before a PO, e.g., to achieve a specific residual frequency error after synchronization.

Such a default operation may not always provide more power savings as compared to the legacy behavior, i.e., the wireless communication device 512 always waking up, monitoring its PO, and trying to decode the paging PDxCH. Furthermore, the wireless communication device 512 may need to wake up one or more times before a PO to employ potential RSs, e.g., SSB, TRS, CSI-RS for mobility, CSI-RS, etc., in order to acquire sufficient synchronization in order to successfully decode paging PDxCH, e.g., a specific PDxCH decoding block error rate (BLER). An example of this scenario happens when the wireless communication device 512 is in very good coverage, and thus it may not even need to wake up for a RS before its PO, and thereby the power consumption of the wireless communication device 512 increases because it has to monitor PEI and then, if PEI arrives, it monitors its PO.

As such there is a need for systems and methods which helps the wireless communication device 512 to determine if it is beneficial from power savings perspective to monitor or skip a PEI. Below such example embodiments are described.

Figure 7:
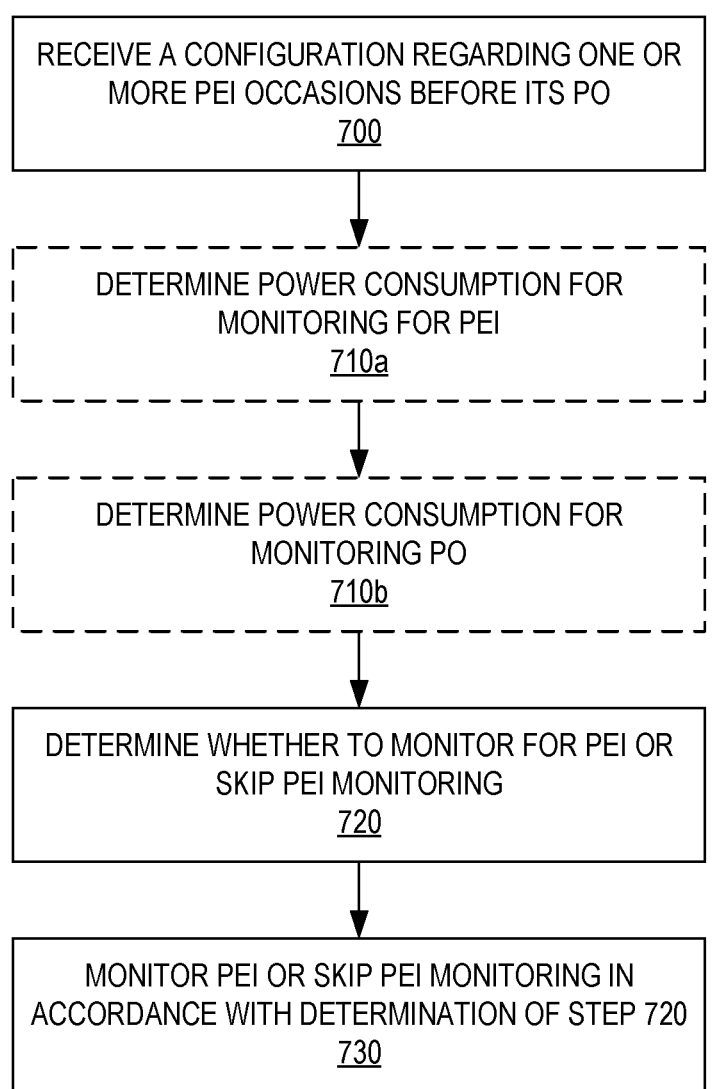
FIG. 7 is a flow chart that illustrates the operation of a wireless communication device to decide whether to monitor or skip one or more PEI occasions before a PO in accordance with one example embodiment of the present disclosure

FIG. 7 is a flow chart that illustrates the operation of a wireless communication device 512 to decide whether to monitor or skip one or more PEI occasions before a PO in accordance with one example embodiment of the present disclosure. Note that optional steps are represented by dashed lines/boxes. The steps of the process are as follows.

Step 700: The wireless communication device 512 receives, from a network node (e.g., a base station 502), information that configures one or more PEI occasions before an associated PO(s) of the wireless communication device 512. As explained above, in this step, the wireless communication device 512 receives the underlying configuration of PEI from, e.g., higher layer signaling, and thus determines the PEI occasion(s) associated with its own PO(s). Based on this information, the wireless communication device 512 derives the offsets between signals of interest—SSB-to-PEI offset, PEI-to-PO offset, etc.

Step 710*a* (Optional): In the "a" part of Step 710, the wireless communication device 512 determines the required power consumption at the wireless communication device 512 to monitor its PEI occasion(s). This power consumption herein is denoted as $P_{PEI}$.

This power consumption can include the required power to: wake-up before each associated PEI occasion, prepare (loop convergence) for PEI reception, monitor for a PEI and detect/decode a potentially transmitted PEI (e.g., weighted with an expected paging or PEI transmission rate), and/or the imposed additional power consumption after PEI and before an associated PO. The latter refers to the potentially additional power consumption that can happen between a PEI and a PO in addition to normal paging reception. E.g., the distance between PEI and a PO may be short, and thus the wireless communication device 512 cannot go back to deep sleep, and thus a light/micro sleep transition, or remaining in a non-deep sleep state, lead to additional power consumption. In an alternative case when e.g., PEI is far from a PO and thus the wireless communication device 512 can go back to deep sleep, transitioning to/from deep sleep incurs additional transition energy. Even in this case, the transition energy to deep sleep is the additional power consumption after PEI.

The wireless communication device 512 may additionally consider the length of required PEI monitoring, i.e., the number of PEI occasions constituting the PEI monitoring window. The power level associated with signal reception activity during the PEI monitoring and its duration can be considered in estimating the $P_{PEI}$.

Furthermore, to receive the PEI successfully according to a metric, the wireless communication device 512 may need to wake up early before a PEI occasion to prepare for PEI reception, e.g., synchronization using one or more RSs, e.g., SSB, TRS, CSI-RS for mobility, or CSI-RS. The corresponding metric can be e.g., an upper bound on miss-detection rate, or an upper bound on a PEI BLER, etc. The wireless communication device 512 may determine the number of required RSs e.g., to achieve a specific residual frequency offset, based on one or more of channel quality, e.g., SINR, SS-RSRQ, SS-RSRP, DRX cycle length, previous synchronization impact, expected receiver initial synchronization errors, number of employed Rx antennas, Doppler frequency shift, the PEI size, e.g., if PEI is DCI based, the number of bits in DCI, etc.

Step 710*b* (Optional): In the "b" part of Step 710, the wireless communication device 512 determines the required UE power consumption with or without PEI monitoring. This power consumption herein is denoted as $P_{PO}$.

In one example, the wireless communication device 512 determines the associated power consumption to successfully decode a potential paging PDxCH in order to satisfy a specific metric, e.g., to decode a paging PDxCH with an upper bound on the corresponding BLER. To satisfy this metric, in addition to waking up and monitoring the PO, the wireless communication device 512 may need to wake up one or more times before a PO, in order to prepare for the successful decoding of the paging PDxCH. The preparation includes waking up for one or more RSs before a PO to acquire synchronization with the necessary accuracy. The necessary synchronization can be e.g., a range of potential frequency offsets, e.g., within 2 kHz from the carrier frequency, or expressed as parts-per-million (PPM), etc. The wireless communication device 512 may then determine the number of pre-PO wakeups based on one or more of channel quality, e.g., SINR, SS-RSRQ, SS-RSRP, DRX cycle length, previous synchronization impact, expected receiver initial synchronization errors, number of employed Rx antennas, Doppler frequency shift, and the spectral efficiency used by the NW for paging PDSCH provision, etc. The wireless communication device 512 may have knowledge of said spectral efficiency either based on historically gather data, or based on provided assistance from the NW; e.g., the NW might have indicated to the wireless communication device 512 the level of modulation/coding/Transport Block Size (TBS)/TB-scaling-factor the NW intends to use for paging and therefore the wireless communication device 512 knows based on current SINR the amount of necessary pre-PO wakeups. Based on said determination of number of POs, the wireless communication device 512 can calculate the associated power consumption for all the underlying components necessary to successfully decode a potential paging PDxCH in its PO without PEI.

Furthermore, the wireless communication device 512 can calculate the required power consumption to successfully decode a potential paging PDxCH as described above after having monitored the PEI, denoted as $P_{PO,PEI}$. In this case, the total power is not necessarily the addition of the power consumption without PEI as described above and the power needed at the wireless communication device 512 to detect/decode PEI as in Step 710*a* but it may be lower. One of the reasons is that the wireless communication device 512 may have already acquired a specific level of preparation for its PO, and thus can reduce the number of wake-ups before its PO e.g., to acquire synchronization. In addition, it is also possible that the location of the PEI is quite close to the PO and as such, the energy for sleep-awake transition should not be calculated twice.

Step 720. In this step, the wireless communication device 512 determines whether to monitor or skip PEI monitoring. In one embodiment, this determination is made based on the calculated powers in Steps 710*a* and 710*b*. In one example, the wireless communication device 512 may be aware of the expected or a maximum paging rate, i.e., the ratio of PO which includes a paging PDxCH denoted by PR. As such the wireless communication device 512 may calculate the expected total power of employing PEI monitoring before a PO, i.e., to monitor PEI before a PO as follows denoted by $P_{PEI,t}$ $$P_{PEI,t}=PR^*P_{PO,PEI}+(1-PR)P_{PEI}$$

In one approach, if $P_{PEI,t}<P_{PO}$, then the wireless communication device 512 decides to monitor PEI before the PO, otherwise, it may decide to skip PEI monitoring and directly monitor PO.

In another example, if $P_{PEI}$ is equal to $P_{PO}$ or within a specific range of $P_{PO}$, then the wireless communication device 512 again can decide to skip PEI monitoring.

In another example, the wireless communication device 512 may skip PEI monitoring if $P_{PEI}$ is larger than a specific threshold. A simple threshold in this case can be e.g., $P_{PO}$.

In another example, the wireless communication device 512 may skip Steps 710*a* and 710*b* and decide to monitor PEI or skip PEI monitoring based on other conditions, e.g., the channel quality, e.g., SINR, SS-RSRP, SS-RSRQ. E.g., if the SINR is higher than a specific threshold, the wireless communication device 512 decides to skip PEI monitoring and, if it is lower, the wireless communication device 512 decides to monitor the PEI. Alternatively, if the SINR is lower than a specific threshold, then the wireless communication device 512 may decide to go through Steps 710*a* and 710*b* and then follow procedures described herein. Alternatively, the reverse may be applied—if the SINR is higher than a specific threshold, then the wireless communication device 512 may decide to go through Steps 710*a* and 710*b* to decide whether to monitor PEI, while it always monitors the PEI if the SINR is below a threshold.

In another example, the wireless communication device 512 may skip PEI monitoring based on the DRX cycle length, e.g., if DRX cycle length is lower than a specific threshold, then the wireless communication device 512 may skip PEI but, if it is higher, the wireless communication device 512 either monitors PEI or goes through one or more of the other procedures described herein to decide to monitor or skip PEI.

In one embodiment, the wireless communication device 512 may additionally or alternatively decide whether to monitor PEI based on required paging detection reliability. If the traffic type does not tolerate missed paging, the wireless communication device 512 may choose to skip PEI monitoring and always monitor the PO in order to avoid the risk of missed paging due to a missed PEI. To support this decision, the wireless communication device 512 may evaluate the PEI signal quality in cases a PEI is received. If the SINR margin for successful threshold is below a threshold, where the threshold may be traffic type-dependent, the wireless communication device 512 does not monitor PEI.

In a related group of solutions, the wireless communication device 512 may not perform a quantitative power consumption comparison of the alternative approaches during operation but uses a predetermined set of rules to determine whether or not to monitor PEI, e.g. depending on a combined state of channel quality, estimated paging rate, PEI monitoring window length, traffic type, etc.

Step 730. In this step, based on the outcome of Step 720, the wireless communication device 512 either monitors for PEI or skips PEI monitoring. If the wireless communication device 512 decides in Step 720 to monitor PEI, then the wireless communication device 512 monitors PEI in one or more of the associated PEI occasions, and, if PEI indicates that a paging message is to be transmitted in an upcoming PO, then the wireless communication device 512 monitors the corresponding PO. Alternatively, if the outcome of Step 720 is that the wireless communication device 512 can skip PEI monitoring, then the wireless communication device 512 can skip one or more PEI occasions and then monitor its PO.

In one embodiment, the wireless communication device 512 assists the NW in deciding whether to provide PEI to the wireless communication devices 512 of the cell. Such assistance may entail perceived SNR/SINR/RSRP/RSRQ at the wireless communication device 512 or alternately/additionally just simply the number of SSBs/TRS occasions the wireless communication device 512 had to wake up before the PDSCH reception.

Alternately, the assistance may only inform the NW whether the wireless communication device 512 ignored PEI (e.g., a single indicator informing PEI_used/PEI_notUsed). Alternately, if allowed (e.g., according to configuration in broadcast SI), the wireless communication device 512 may propose provision of PEI to the NW. Such assistance may be provided by the wireless communication device 512 to the NW piggy-backed on connection setups without any extra transmission cost for the wireless communication device 512. For example, in case of paging, in the associated paging response, the UE may provide/piggy-back such information.

Alternatively, the wireless communication device 512 may communicate such assistance information to the NW in the connected mode (i.e., RRC_Connected), e.g., if the wireless communication device 512 is stationary within one place, or within a range in the cell, or in case the wireless communication device 512 expects to move to lower coverage areas in the cell, etc.

In another embodiment, the NW may order some wireless communication devices to gather statistics (e.g., PEI used/ not used/PEI beneficial etc.) before PO and that PO's associated beam (e.g., which SSB/wide beam it was processing) in a cell and provide such information to the NW upon request. As such, the existing 3GPP-specified MDT (minimization of drive test) framework and procedures could be extended to carry such information.

Based on the assistance information provided by the wireless communication device 512, the NW may then change its PEI provision scheme, perhaps on beam level.

Figure 8:
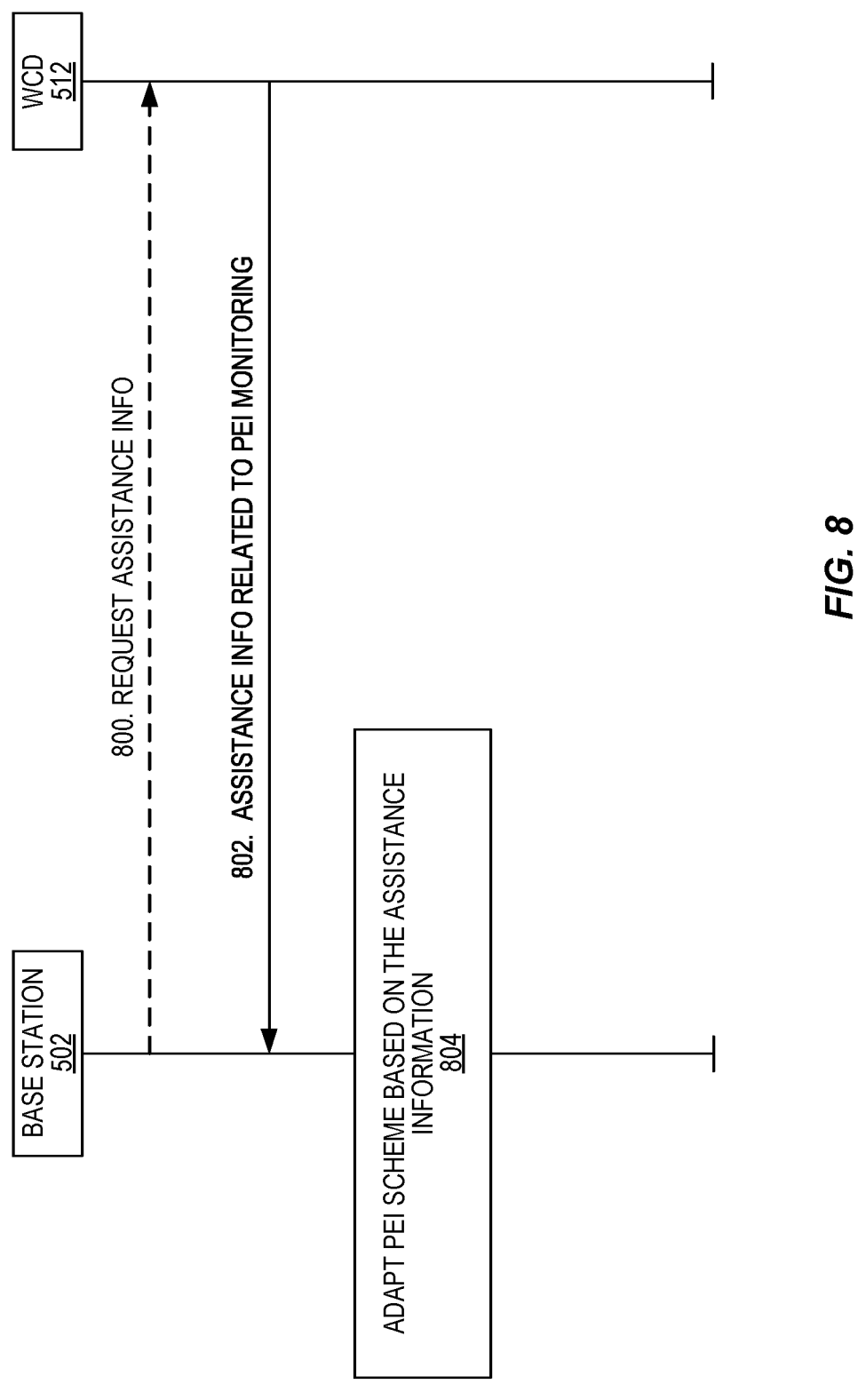
FIG. 8 illustrates the operation of a wireless communication device and a base station in regard to PEI related assistance information in accordance with an example embodiment of the present disclosure.

In this regard, FIG. 8 illustrates the operation of a wireless communication device 512 and a base station 502 in regard to such assistance information in accordance with an example embodiment of the present disclosure. Optional steps are represented by dashed lines/boxes. As illustrated, the base station 502 sends a request for assistance information related to PEI monitoring to the wireless communication device 512 (step 800). Note that this request may be sent to the wireless communication device 512 or sent to a group of wireless communication devices 512.

The wireless communication device 512 sends, to the base station 502, assistance information related to PEI monitoring (step 802). This assistance information may include any of the assistance information described above. The base station 502 then adapts its PEI scheme based on the assistance information received from the wireless communication device 512 and, optionally, similar assistance information received from additional wireless communication devices 512 (step 804). For example, the base station 502 may change its PEI provision scheme, perhaps on the beam level, as described above.

Figure 9:
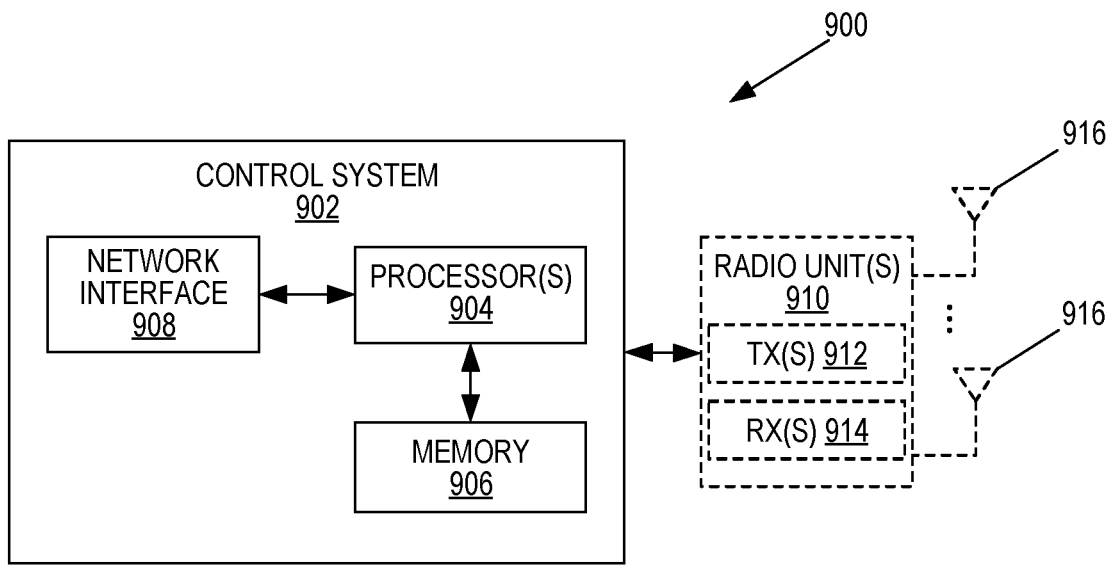
FIGS. 9, 10, and 11 are schematic block diagrams of example embodiments of a network node (e.g., a base station or network node that implements at least part of the functionality of a base station) in which embodiments of the present disclosure may be implemented.

FIG. 9 is a schematic block diagram of a network node 900 according to some embodiments of the present disclosure. Optional features are represented by dashed boxes. The network node 900 may be, for example, a base station 502 or 506 or a network node that implements all or part of the functionality of the base station 502 as described herein. As illustrated, the network node 900 includes a control system 902 that includes one or more processors 904 (e.g., Central Processing Units (CPUs), Application Specific Integrated Circuits (ASICs), Field Programmable Gate Arrays (FP-GAs), and/or the like), memory 906, and a network interface 908. The one or more processors 904 are also referred to herein as processing circuitry. In addition, if the network node 900 is a radio access node (e.g., a base station 502), the network node 900 may include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of the network node 900 as described herein (e.g., one or more functions of the base station 502 or network node/network, as described herein). In some embodiments, the function(s) are implemented in software that is stored, e.g., in the memory 906 and executed by the one or more processors 904.

Figure 10:
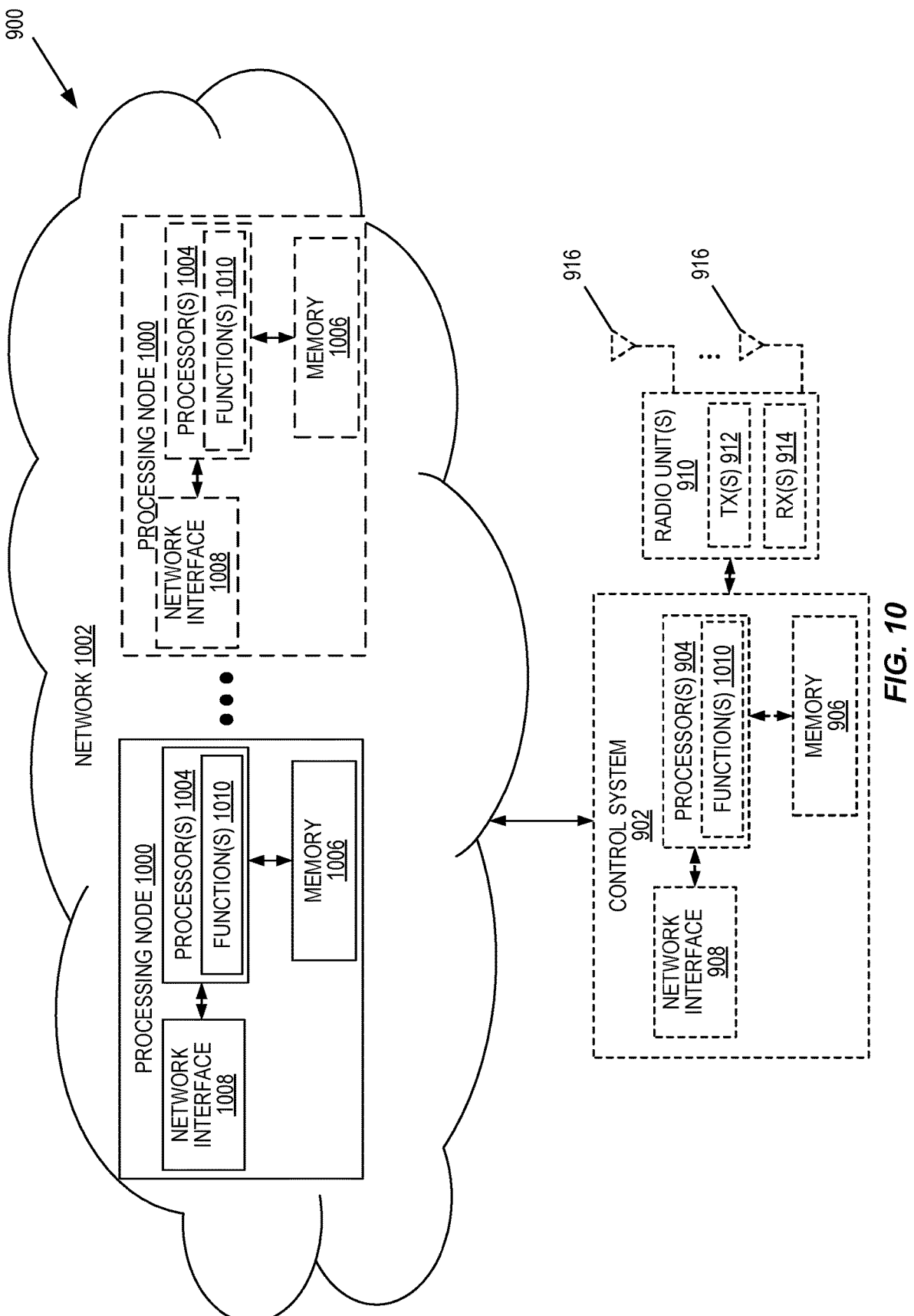

FIG. 10 is a schematic block diagram that illustrates a virtualized embodiment of the network node 900 according to some embodiments of the present disclosure. Again, optional features are represented by dashed boxes. As used herein, a "virtualized" network node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 includes one or more processing nodes 1000 coupled to or included as part of a network(s) 1002. Each processing node 1000 includes one or more processors 1004 (e.g., CPUs, ASICs, FPGAs, and/or the like), memory 1006, and a network interface 1008. If the network node 900 is a radio access node (e.g., a base station 502), the network node 900 may include the control system 902 and/or the one or more radio units 910, as described above. The control system 902 may be connected to the radio unit(s) 910 via, for example, an optical cable or the like. If present, the control system 902 or the radio unit(s) are connected to the processing node(s) 1000 via the network 1002.

In this example, functions 1010 of the network node 900 described herein (e.g., one or more functions of the base station 502 or network node/network, as described herein) are implemented at the one or more processing nodes 1000 or distributed across the one or more processing nodes 1000 and the control system 902 and/or the radio unit(s) 910 in any desired manner. In some particular embodiments, some or all of the functions 1010 of the network node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 may be used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of the network node 900 or a node (e.g., a processing node 1000) implementing one or more of the functions 1010 of the network node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
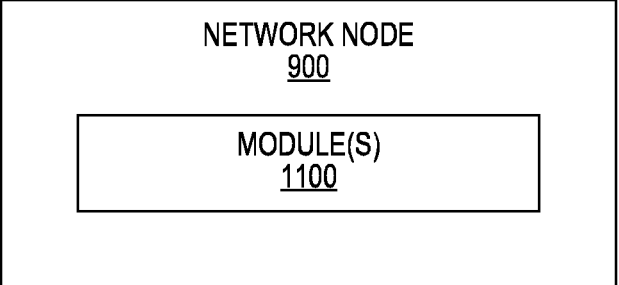

FIG. 11 is a schematic block diagram of the network node 900 according to some other embodiments of the present disclosure. The network node 900 includes one or more modules 1100, each of which is implemented in software. The module(s) 1100 provide the functionality of the network node 900 described herein (e.g., one or more functions of the base station 502 or network node/network, as described herein). This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
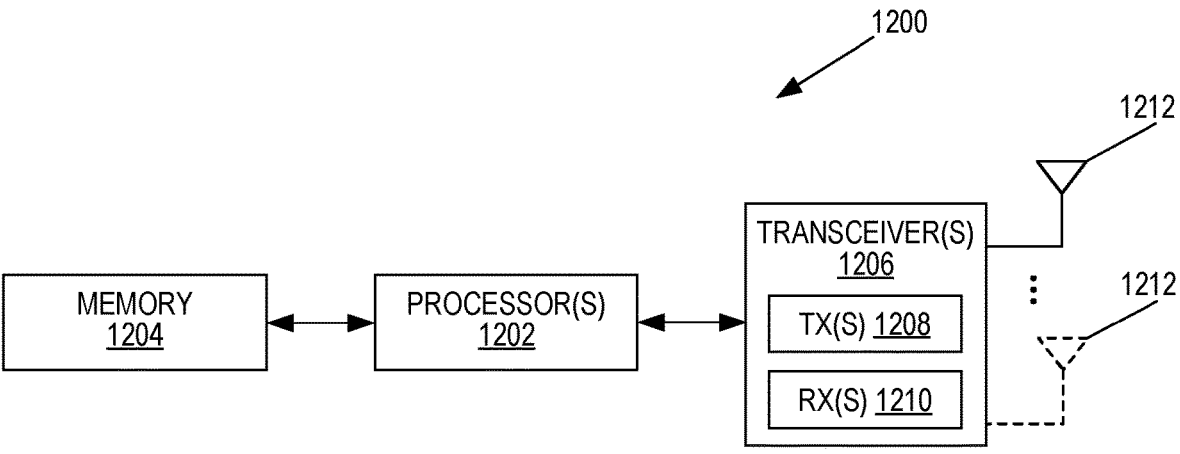
FIGS. 12 and 13 are schematic block diagrams of example embodiments of a wireless communication device (e.g., a User Equipment UE)) in which embodiments of the present disclosure may be implemented.

FIG. 12 is a schematic block diagram of a wireless communication device 1200 (e.g., the wireless communication device 512 or a UE) according to some embodiments of the present disclosure. As illustrated, the wireless communication device 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the wireless communication device 1200 described above (e.g., one or more functions of the wireless communication device 512 or UE as described herein) may be fully or partially implemented in software that is, e.g., stored in the memory 1204 and executed by the processor(s) 1202. Note that the wireless communication device 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the wireless communication device 1200 and/or allowing output of information from the wireless communication device 1200), a power supply (e.g., a battery and associated power circuitry), etc.

In some embodiments, a computer program including instructions which, when executed by at least one processor, causes the at least one processor to carry out the functionality of the wireless communication device 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
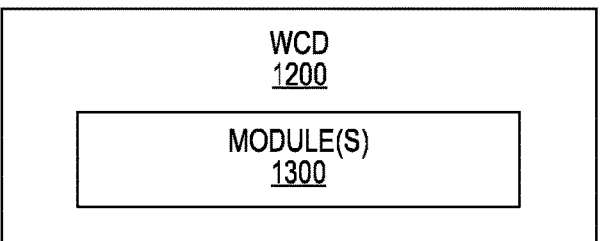

FIG. 13 is a schematic block diagram of the wireless communication device 1200 according to some other embodiments of the present disclosure. The wireless communication device 1200 includes one or more modules 1300, each of which is implemented in software. The module(s) 1300 provide the functionality of the wireless communication device 1200 described herein (e.g., one or more functions of the wireless communication device 512 or UE as described herein).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method performed by a wireless communication device comprising:

receiving, from a network node, information that configures one or more paging early indicator, PEI, occasions prior to a paging occasion, PO, of the wireless communication device;

either monitoring for a PEI in the one or more PEI occasions or skipping monitoring for a PEI in the one or more PEI occasions based on one or more parameters, wherein the one or more parameters comprise a signal to interference plus noise ratio, SINR, perceived at the wireless communication device, and

the method further comprises:

skipping monitoring for a PEI in the one or more PEI occasions if the SINR is above a threshold SINR level.

2. The method of claim 1 further comprising:

monitoring for a PEI in the one or more PEI occasions if the SINR is lower than the threshold SINR level.

3. The method of claim 1 wherein the one or more parameters further comprise a paging rate, and skipping monitoring for a PEI in the one or more PEI occasions if the SINR is above the threshold SINR level and the paging rate is above a paging rate threshold.

4. The method of claim 1 wherein the one or more parameters comprise:

a traffic type, and the method further comprises skipping PEI monitoring and always monitoring the PO if the traffic type does not tolerate missed paging.

5. The method of claim 1, wherein the one or more parameters further comprise a Discontinuous Reception, DRX, cycle length of a DRX configuration of the wireless communication device.

6. The method of claim 1, wherein the one or more parameters further comprise a required paging detection reliability.

7. The method of claim 1 wherein the one or more parameters further comprise a combined state of channel quality, estimated paging rate, PEI monitoring window length, and/or traffic type.

8. The method of claim 1, further comprising providing, to the network node, assistance information related to PEI monitoring at the wireless communication device.

9. The method of claim 1, wherein the SINR is determined based on the spectral efficiency used for the network node transmitting a paging related message.

10. The method of claim 9, wherein said spectral efficiency is either based on historically gathered data or based on provided assistance from the network node.

11. The method of claim 1, wherein the threshold SINR level is based on a level of coding used for the paging message.

12. A wireless communication device comprising:

one or more transmitters;

one or more receivers; and processing circuitry associated with the one or more transmitters and the one or more receivers, the processing circuitry configured to cause the wireless communication device to:

receive, from a network node, information that configures one or more paging early indicator, PEI, occasions prior to a paging occasion, PO, of the wireless communication device;

either monitor for a PEI in the one or more PEI occasions or skip monitoring for a PEI in the one or more PEI occasions based on one or more parameters, wherein the one or more parameters comprise a signal to interference plus noise ratio, SINR, perceived at the wireless communication device, and skipping monitoring for a PEI in the one or more PEI occasions if the SINR is above a threshold SINR level.

13. The wireless communication device of claim 12, wherein the processing circuitry is further configured to cause the wireless communication device to: monitor for a PEI in the one or more PEI occasions if the SINR is lower than the threshold SINR level.

14. The wireless communication device of claim 12, wherein the one or more parameters further comprises a paging rate, and the wireless communication device is further adapted to skip monitoring for a PEI in the one or more PEI occasions if the SINR is above the threshold SINR level and the paging rate is above a paging rate threshold.

15. The wireless communication device of claim 12, wherein the one or more parameters further comprise traffic type, and wherein the processing circuitry is further configured to cause the wireless communication device to: skip PEI monitoring and always monitor the PO if the traffic type does not tolerate missed paging.

16. The wireless communication device of claim 12, wherein the one or more parameters further comprise a Discontinuous Reception, DRX, cycle length of a DRX configuration of the wireless communication device.

17. The wireless communication device of claim 12, wherein the one or more parameters further comprise a required paging detection reliability.

18. The wireless communication device of claim 12, wherein the one or more parameters further comprise a combined state of channel quality, estimated paging rate, PEI monitoring window length, and/or traffic type.

19. The wireless communication device of claim 12, wherein the processing circuitry is further configured to cause the wireless communication device to: provide to the network node, assistance information related to PEI monitoring at the wireless communication device.

20. The wireless communication device of claim 12, wherein the SINR is determined based on the spectral efficiency used for the network node transmitting a paging related message.

21. The wireless communication device of claim 20, wherein said spectral efficiency is either based on historically gathered data or based on provided assistance from the network node.

22. The wireless communication device of claim 12, wherein the threshold SINR level is based on a level of coding used for the paging message.

23. A non-transitory computer readable medium comprising instructions executable by processing circuitry of a wireless communication device whereby the wireless communication device is operable to:

receive, from a network node, information that configures one or more paging early indicator, PEI, occasions prior to a paging occasion, PO, of the wireless communication device;

either monitor for a PEI in the one or more PEI occasions or skip monitoring for a PEI in the one or more PEI occasions based on one or more parameters, wherein the one or more parameters comprise a signal to interference plus noise ratio, SINR, perceived at the wireless communication device, and skipping monitoring for a PEI in the one or more PEI occasions if the SINR is above a threshold SINR level.

* * * * *